Feb. 1, 1966  TADASHI KASAHARA  3,232,197

OPTICAL SYSTEM FOR A SINGLE-LENS REFLEX CAMERA

Filed June 6, 1962  2 Sheets-Sheet 1

Tadashi Kasahara,
Inventor

By Wenderoth, Lind and Ponack,
Attorneys

Feb. 1, 1966    TADASHI KASAHARA    3,232,197
OPTICAL SYSTEM FOR A SINGLE-LENS REFLEX CAMERA
Filed June 6, 1962    2 Sheets-Sheet 2

| United States Patent Office | 3,232,197
Patented Feb. 1, 1966 |
|---|---|

3,232,197
OPTICAL SYSTEM FOR A SINGLE-LENS REFLEX CAMERA
Tadashi Kasahara, 1604 1-chome, Ekoda, Nakano-ku, Tokyo, Japan
Filed June 6, 1962, Ser. No. 200,448
Claims priority, application Japan, June 8, 1961, 36/19,861
4 Claims. (Cl. 95—42)

This invention relates to an optical system for a single-lens reflex camera wherein a small reflector is contained by using the principle of the design of a photographic lens of a triplet type and it is intended to form a photographing lens in which the aberration correction is very favorable and to facilitate the formation of the finder system, the aberration correction in the finder system and the close formation of the whole optical system by selecting the position of the small reflector within the lens.

There is already known an optical system wherein one to three small reflectors of a high reflection factor having an area small enough as compared with the maximum light pencil passing through a photographic lens are arranged in proper positions in the space belonging to the object side from the diaphragm within the photographic lens so that a small portion of the light pencil to be used for photographing may be separated to the optical system of a finder and may form an image and, while the loss of the light reaching the sensitized material is kept minimum by magnifying and observing the image, a very bright finder image may be obtained.

However, such optical system has been so far applied only to such photographic camera or lens system wherein the angle of field is comparatively small and no high optical performance is required as of the zoom lens for small movie cameras but has never been applied to a single-lens reflex camera or the like wherein general films, for example, 35 mm. films are used.

That is to say, in a photographic camera using 35 mm. films, as the angle of field of the main photographing lens must be larger than ±20 degrees, if a prism containing a small reflector is contained in the lens, a great obstacle will be caused to the correction of the aberration of the photographing lens and to the prevention of the reduction of the peripheral light. This is one of the causes of obstructing the application of this kind of optical system.

Further, in case such main photographing lens is obtained, the light pencil separated from said small reflector will have to form an image in a proper position so that an erect image may be magnified and observed. However, it is very difficult to closely contain such optical elements in a space comparable to that of a conventional 35 mm. camera.

As abovementioned, according to the present invention, a small reflector is contained by using the principle of the design of a photographic lens of a triplet type and it is intended to form a photographing lens in which the aberration correction is very favorable and to facilitate the formation of the finder system, the aberration correction in the finder system and the close formation of the whole optical system by selecting the position of the small reflector within the lens.

If the thus formed optical system is used, as compared with the lens shutter type single-lens reflex camera of the same kind, such mechanisms as of the vertical movement of the reflector and the automatically pre-set diaphragm will be able to be omitted, therefore a camera having a simple mechanical construction will be able to be manufactured and will be very favorable in the price and the shock by the reflector and the disappearance of the image in the finder at the time of photographing which are the greatest defects of the conventional 35 mm. single-lens reflex camera will be able to be eliminated all at once.

In a single-lens reflex camera of this kind, even when the diaphragm of the main photographing lens is operated, the brightness of the image and the range finding function in the finder should not be impaired. It is therefore necessary that said small reflector should be arranged on the object side from the diaphragm.

On the hand, the standard photographing lens used in 35 mm. camera is usually a comparatively wide angle lens of more than ±20 degrees. Therefore, unless the arrangement of the diaphragm within the photographic lens is proper, the image forming performance and the intensity of illumination in the peripheral part of the picture will reduce. It is therefore preferable in a known photographic lens to locate the diaphragm near the middle of the lens.

Thus, in case said small reflector is located on the image side from the main photographing lens, the position of the diaphragm will remarkably retreat from the main photographing lens. From the viewpoint of the aberration and peripheral light, it is nearly impossible to realize such optical system.

As a result of the above consideration, it is clear that the above mentioned reflector must be contained within the main photographing lens. Further, in order that the range finding function corresponding to the sensitized material surface of the camera may be held within the field of vision in the finder, focusing must be made by moving the optical system members located on the object side from said small reflector.

In the drawings, FIGURE 1(a-d) is a sketch showing four types of the known triplet type photographic lens.

The photographic lens of this kind is known as a so-called front-lens rotating type lens and is usually of a so-called triplet type having the first block I consisting of a condensing single lens or compound lens made by bonding two or three lenses wtih the air contact surface of a large curvature directed toward the object space, the diffusive second block II made of a single lens or two bonded lenses with both air contact surfaces made concave and the condensing third block III formed of a single lens or two bonded lenses with the air contact surface of a large curvature directed toward the image space as shown in FIGURE 1.

In the lens of this type, the coma aberration in the Seidel range as produced in the first lens has such a small value that, even when the first lens is somewhat moved in the direction of the optical axis of the first lens, the variation given to the aberration of the diagonal light pencil will be comparatively so small that the front-lens rotating type focusing will be made possible. This is a condition very advantageous to embodying the present invention.

In arranging said small reflector in the triplet type lens of this kind, the glass block of parallel planes in which said small reflector is embedded may be inserted between the first block I and the second block II or between the second block II and the third block III. Further, in order to locate the diaphragm in the middle of the lens system, it is preferable to insert the small reflector between the first block I and the second block II.

However, as a result of scrutinizing the photographic lenses of the known triplet type, it is found clear that generally, in most cases, the distance between the first block I and the second block II is less than .1 times as large as the resultant focal distance of the main photographing lens and that, when this distance is made larger, it will become difficult to correct the coma aberration for the light pencil of a wide photographing angle.

Further, in the triplet type, from the necessity of correcting the Petzval sum and chromatic aberration, it is preferable to make the resultant focal distance of the first block I less than .6 times as large as the resultant focal distance of the whole system. However, it will make very difficult the process of leading the light pencil separated by the small reflector to the finder system and correcting the aberration in the finder system.

Figure 1A:
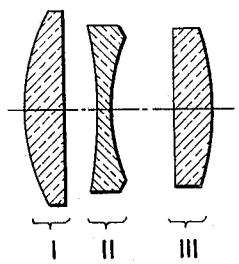

On the other hand, in case said small reflector is arranged between the second block II and the third block III, in the type shown in FIGURE 1a, it will be advantageous to the correction of the aberration that the distance between the second block II and the third block III is more than .1 times as large as the resultant focal distance of the whole system. In the other examples in FIGURE 1, too, it will not be so significant to the aberration correction to increase the distance between the second block II and the third block III.

In the known triplet type, when the resultant focal distance of the whole system is $f$, the resultant focal distance $f_{\text{I-II}}$ of the first block I and the second block II will be often $$f_{\text{I-II}} > 10f$$

or $$f_{\text{I-II}} < -2f$$

and the aberrations produced in the first block I and the second block II lens to be over-corrected.

As shown later, these conditions are rather advantageous to the formation of the finder system.

The thickness in the direction of the optical axis of the main lens of the glass of parallel planes having a small reflector embedded therein depends on the photographing angle and the aperture ratio of the main photographing lens and must be so elected as not to reduce the photographing light pencil of the main photographing lens and the diagonal light pencil path of the optical system of the finder. But, for the above mentioned reasons, when the glass of parallel planes is inserted between the second block II and the third block III, even if the thickness in the direction of the optical axis of said glass of parallel planes reaches about .2 times as large as the resultant focal distance of the main photographing lens it will be possible to make a comparatively good aberration correction. The diaphragm is arranged between the glass of parallel planes having the small reflector embedded therein and the second block II of close to the image side of the second block II.

The latter arrangement is a little disadvantageous to the aberration correction but, on the other hand, it is possible therein to handle the diaphragm independently of the main photographing lens. Therefore, in the case that the diaphragm and shutter are integrally formed as in a lens shutter camera, said arrangement will be advantageous to the construction.

In either arrangement, it is so advantageous to the peripheral light and aberration correction to reduce the total length of the optical system that it is preferable that the air distance between the first block I and the second block II should be less than .1 times as large as the resultant focal distance of the whole system.

Figure 1B:
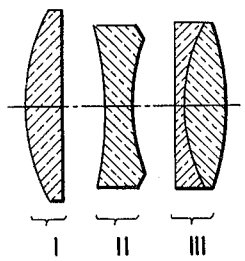
Figure 1C:
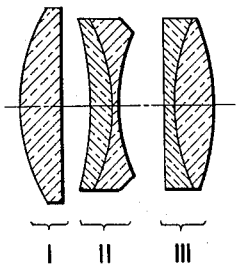
Figure 1D:
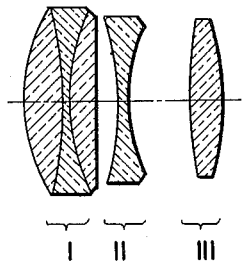
Figure 2:
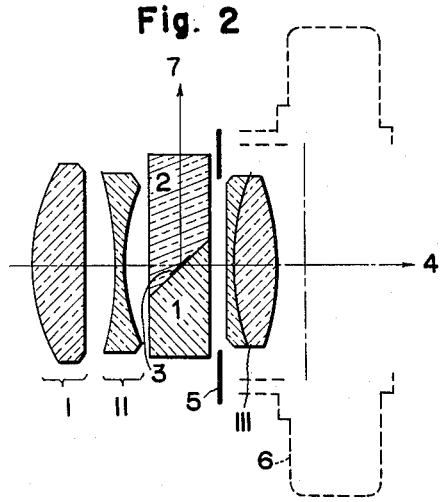
FIGURE 2 is a sketch of an embodiment of the present invention wherein a glass block of parallel planes containing a small reflector is inserted between the blocks II and III of the photographic lens shown in FIGURE 1b.

Thus, when the glass of parallel planes containing a small reflector is inserted between the second block II and the third block III of the triplet type lens exemplified in FIGURE 1 such optical system as is shown in FIGURE 2 will be able to be obtained.

FIGURE 2 shows an embodiment in the Tessar type lens shown in FIGURE 1b. The greater part of the light incident upon this optical system will pass through the first block I, the second block II, the glass of parallel planes formed by pasting two glass members 1 and 2 together and the third block III to form a photographic image on a sensitized material 4. A small portion of the light incident upon this optical system will be separated to a finder system 7 by some small reflectors 3 set on the bonding surface of the glass members 1 and 2. 5 is a diaphragm for controlling the brightness as of the photographic lens system. 6 is lens shutter.

The following Table 1 shows numerical values as of the photographic lens in the above embodiment wherein the resultant focal distance is determined so as to be 1.0, the maximum aperture ratio is 1:2.8 and the aberration is corrected so that the lens may be nothing inferior to the conventional Tessar type lens in the range of the maximum angle of field of ±23 degrees.

Table 1

| | r | t | d | nd | vd |
|---|---|---|---|---|---|
| I {1 | .376 | .1 | | 1.717 | 47.9 |
| {2 | 29.5 | | .058 | | |
| II {3 | −.91 | .02 | | 1.673 | 32.2 |
| {4 | .333 | | .045 | | |
| 5 | ∞ | .12 | | 1.516 | 64.0 |
| 6 | ∞ | | .03 | | |
| III {7 | 4.0 | .018 | | 1.603 | 38.0 |
| {8 | .486 | .08 | | 1.717 | 47.9 |
| {9 | −.610 | | | | |

In Table 1, $r$ is a radius of curvature of each refractive surface, $t$ is a thickness in the direction of the optical axis of the element refractive member, $d$ is a distance in the direction of the optical axis of the air gap, $nd$ is a refractive index for the line $d$ of each refractive member and $vd$ is an Abbe number.

Figure 3:
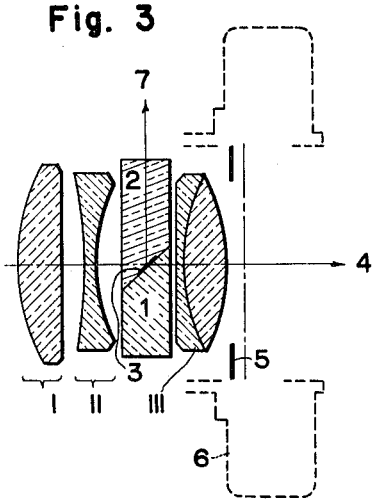
FIGURE 3 is a sketch of another embodiment of the same type.

The embodiment in FIGURE 3 is similar to the one in FIGURE 2 but is different in the fact that the diaphragm 5 is made integral with the lens shutter 6 and is located behind the lens so that the construction of the whole camera may be simplified in FIGURE 3. Therefore, the length in the direction of the optical axis of the whole lens system is made as small as possible so that, when the aperture of the diaphragm is made smaller, the intensity of illumination in the peripheral part of the picture may not reduce.

The following Table 3 shows numerical values of this embodiment determined so that the embodiment may be used under the conditions of resultant focal distance of 1.0, a maximum aperture ratio of 1:2.8 and an angle of field of ±22 degrees.

Table 2

| | r | t | d | nd | vd |
|---|---|---|---|---|---|
| I {1 | .365 | .09 | | 1.713 | 43.2 |
| {2 | 12.2 | | .046 | | |
| II {3 | −.92 | .02 | | 1.673 | 32.2 |
| {4 | .323 | | .045 | | |
| 5 | ∞ | .11 | | 1.516 | 64.0 |
| 6 | ∞ | | .004 | | |
| III {7 | ∞ | .018 | | 1.603 | 38.0 |
| {8 | .40 | .075 | | 1.717 | 47.9 |
| {9 | −.546 | | | | |

In case a single-lens reflex finder is formed of the above described optical system of the photographic lens, the following points must be satisfied:

(A) The image passing through the first block I, the second block II and the glass block having the small reflectors embedded therein of the photographic lens and through the following optical system of the finder and observed through the eyepiece must be an erect image.

(B) It is preferable that the image formed through the process in (A) above should have a magnification substantially equal to that of the image observed with the naked eyes by the observer.

(C) The image formed in the process in (A) above should have had the aberration corrected.

(D) In order that the above mentioned image given to the observer may always shows correct photographed field of vision with the displacement of the position of the pupil of the observer, it is necessary that a real image should be once within the finder system.

(E) In order that the upper and lower image coinciding type range finder or the like range finding function may be kept within the finder, the spherical aberration and the axial chromatic aberration of the real image formed within the finder systems must have been strictly corrected.

(F) It is preferable that an optical system satisfying the above mentioned points should be housed in a volume as large as of the conventional lens shutter type single-lens reflex 35 mm. camera.

It is very difficult to simultaneously satisfy the above mentioned conditions. However, if a photographic lens of the above exemplified type is combined with the below detailed finder system, it will be possible to realize a cheap single-lens reflex camera with a very simple construction.

Figure 4A:
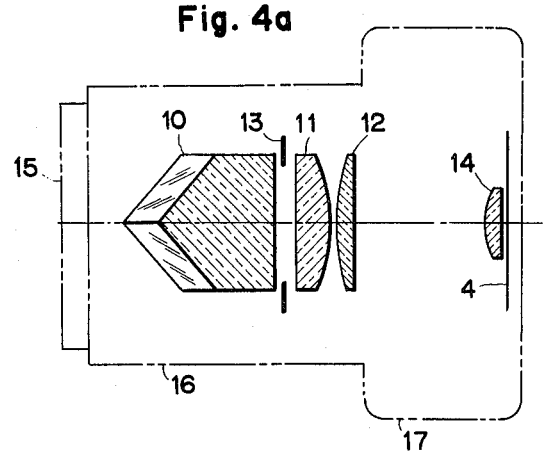
FIGURE 4a is a schematic plan view of a single-lens reflex camera formed by embodying the present invention.
Figure 4B:
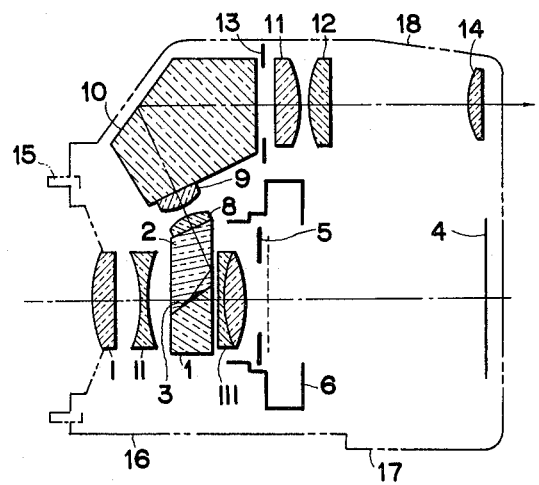
FIGURE 4b is a schematic side view of the same.

FIGURE 4 shows an embodiment of such single-lens reflex camera. In the drawing, the numerals 1 to 6 represent the same respective parts as in FIGURES 2 and 3.

In FIGURE 4, the bonding surface of the glass members 1 and 2 has an angle of inclination smaller than 45 degrees to the optical axis. Therefore, the light reflected by the small reflector 3 will be totally reflected by the inside surface on the image side of the glass 2 of parallel planes, will then be led to a roof prism 10 through auxiliary image forming lenses 8 and 9 and will form an erect real image near a focus plate 11. The process leading from the small reflector 3 to the real image surface 11 includes a plurality of reflecting surfaces to obtain an erect real image and the light path is necessarily long. However, as already described, the resultant focal distance by the first block I and the second block II has such large value or negative action that, if the refractive forces of the auxiliary image forming lenses 8 and 9 are properly selected, a comparatively free light path length will be obtained.

Further, the light pencil which has passed through the first block I and the second block II of the photographic lens will have the chromatic aberration and monochromatic light aberrations over-corrected and will therefore have them conceled with the aberrations of the auxiliary image forming lenses 8 and 9 having positive refractive forces and the various aberrations of the real image formed near the focus plate 11 except some chromatic difference of magnification and distortion can be easily removed. That is to say, the axial chromatic aberration can be completely corrected by properly selecting the Abbe number of the auxiliary image forming lenses 8 and 9, the spherical aberration can be corrected by the selection of the magnification and the image surface can be made flat by the distribution of the refractive forces of the auxiliary image forming lenses 8 and 9.

The distortion and some chromatic difference of magnification may be corrected on the whole of the finder system. That is to say, if the condenser 12 is properly bent, the distortion remaining on the real image surface of the focus plate 11 will be able to be freely corrected. Also, if the Abbe number of the eyepiece 14 is selected, the difference of magnification will be able to be eliminated.

The focus plate 11 to be used may be of the known upper and lower image coinciding type or the like range finder construction.

Further, in order to make the form as small as possible for a 35 mm. size single-lens reflex camera, it is preferable that the eyepiece 14 should be located on the same plane as of the sensitized material 4 as much as possible. In such case, the total magnification of the optical system of the finder will be controlled by the refractive forces of the auxiliary lenses 8 and 9.

In general, when the size of the real image formed near the focus plate 11 as selected to be .6 to 1 time as large as the size of the real image on the surface of the sensitized material, the total magnification of the whole finder system will be easily made nearly 1 and the aberration of the finder will be favorably corrected.

In FIGURE 4, 15 is a distance setting ring for moving the first block I of the photographic lens in the direction of the optical axis, 16 is a lens barrel and 17 is a camera body.

I claim:

1. An optical system for a lens shutter type single-lens reflex camera, comprising a photographic lens which consists of three lens parts separated from one another by air gaps between them and in which the first lens part is a condensing lens having a curved surface directed toward the object space, the second lens part is a diffusive lens having a concave surface toward the first lens part, and the third lens part is a compound lens having a flat-concave lens and a double convex lens with the flat surface of said flat-concave lens toward said second lens part, and a glass block between the second and third lens parts having flat surfaces opposed to the lens parts on either side thereof, said glass block having a small reflector therein for reflecting part of the light passing through said glass block transversely of the direction in which the light passes through the glass block, and a finder having a plurality of auxiliary lenses and an eyepiece into which the reflector reflects light, the first lens part and the second lens part being spaced a distance $d_{I-II}$ and the resultant focal distance of the first lens part and the second lens part being $f_{I-II}$ and the resultant focal distance of the whole system being $f$, and in which:

$$d_{I-II} < .1f$$
$$f_{I-II} > 10f \text{ and } < -2f$$

and the flat surfaces of the glass block being parallel and the glass block being .2$f$ thick in the direction in which the light passes through it.

2. An optical system as claimed in claim 1 further comprising an integral diaphragm and shutter positioned closely adjacent the third lens part on the side thereof opposite the side facing the glass block.

3. An optical system for a 35 mm. lens shutter type single lens reflex camera, comprising a photographic lens which consists of three lens parts separated from one another by air gaps between them and in which the first lens part is a condensing lens having a curved surface directed toward the object space, the second lens part is a diffusive lens having a concave surface on both sides thereof, and the third lens part is a compound lens having a flat-concave lens and a double convex lens bonded together with the flat surface of said flat-concave lens toward said second lens part, and a glass block between the second and third lens part having parallel flat surfaces perpendicular to the direction in which light passes the block opposed to the lens parts on either side thereof and having from two to three small reflectors therein for reflecting a part of the light passing through the glass block transversely of the direction in which the light passes through the glass block, a finder having at least one auxiliary lens, a prism and an eyepiece into which the light is reflected by the reflectors, and a diaphragm between the glass block and the third lens part, said system having a resultant focal distance of unity, and in which the dimensions of the parts of the system are:

| | | | | |
|---|---|---|---|---|
| 1st part | $r_1=0.376$ | $d_{1-2}=0.1$ | $n_{1-2}=1.717$ | $\nu_{1-2}=47.9$ |
| | $r_2=29.5$ | $d_{2-3}=0.058$ | | |
| 2nd part | $r_3=0.91$ | $d_{3-4}=0.02$ | $n_{3-4}=1.673$ | $\nu_{3-4}=32.2$ |
| | $r_4=0.333$ | $d_{4-5}=0.045$ | | |
| Glass block | $r_5=\infty$ | $d_{5-6}=0.12$ | $n_{5-6}=1.516$ | $\nu_{5-6}=64.0$ |
| | $r_6=\infty$ | $d_{6-7}=0.03$ | | |
| | $r_7=4.0$ | $d_{7-8}=0.018$ | $n_{7-8}=1.603$ | $\nu_{7-8}=38.0$ |
| 3rd part | $r_8=0.486$ | $d_{8-9}=0.08$ | | |
| | $r_9=0.610$ | | $n_{8-9}=1.717$ | $\nu_{8-9}=47.9$ | wherein $r_1, r_2 \ldots r_9$ are the radii of the respective surfaces of the lens parts, counting from the surface closest to the object space, $d_{1-2}, d_{2-3} \ldots d_{8-9}$ are the distances between the surfaces having the radii $r_1$ and $r_2$, $r_2$ and $r_3 \ldots$ and $r_8$ and $r_9$, $n_{1-2}, n_{3-4} \ldots n_{8-9}$ are the indexes of refraction for the lens parts between the surfaces having the radii $r_1$ and $r_2$, $r_3$ and $r_4 \ldots r_8$ and $r_9$, and $\nu_{1-2}, \nu_{3-4} \ldots \nu_{8-9}$ are Abbe numbers for the glass of the lens parts between the surfaces having the radii $r_1$ and $r_2$, $r_3$ and $r_4 \ldots r_8$ and $r_9$.

4. An optical system for a 35 mm. lens shutter type single lens reflex camera, comprising a photographic lens which consists of three lens parts separated from one another by air gaps between them and in which the first lens part is a condensing lens having a surface with a large curvature directed towards the object space, the second lens part is a diffusive lens which is concave on both surfaces, and the third lens part is a compound lens having a flat-concave lens and a double convex lens bonded together with the flat surface of said flat-concave lens toward said second lens part, and a glass block between the second and third lens parts having parallel flat surfaces perpendicular to the direction in which light passes the block and opposed to the lens parts on either side thereof and having from two to three small reflectors therein for reflecting a part of the light passing through the glass block transversely of the direction in which the light passes through the glass block, a finder having at least one auxiliary lens, a prism and an eyepiece into which the light is reflected by the reflectors, and an integral diaphragm and shutter positioned closely adjacent the third lens part on the side thereof opposite the side facing the glass block, said system having a resultant focal distance of unity, and in which the dimensions of the parts of the system are:

| | | | | |
|---|---|---|---|---|
| 1st part | $r_1=0.365$ | $d_{1-2}=0.09$ | $n_{1-2}=1.713$ | $\nu_{1-2}=43.2$ |
| | $r_2=12.2$ | $d_{2-3}=0.046$ | | |
| 2nd part | $r_3=0.92$ | $d_{3-4}=0.02$ | $n_{3-4}=1.673$ | $\nu_{3-4}=32.2$ |
| | $r_4=0.323$ | $d_{4-5}=0.045$ | | |
| Glass block | $r_5=\infty$ | $d_{5-6}=0.11$ | $n_{5-6}=1.516$ | $\nu_{5-6}=64.0$ |
| | $r_6=\infty$ | $d_{6-7}=0.004$ | | |
| | $r_7=\infty$ | $d_{7-8}=0.018$ | $n_{7-8}=1.603$ | $\nu_{7-8}=38.0$ |
| 3rd part | $r_8=0.4$ | $d_{8-9}=0.75$ | | |
| | $r_9=0.546$ | | $n_{8-9}=1.717$ | $\nu_{8-9}=47.9$ |

$r_1, r_2 \ldots r_9$ are the radii of the respective surfaces of the lens parts, counting from the surface closest to the object space, $d_{1-2}, d_{2-3} \ldots d_{8-9}$ are the distances between the surfaces having the radii $r_1$ and $r_2$, $r_2$ and $r_3 \ldots$ and $r_8$ and $r_9$, $n_{1-2}, n_{3-4} \ldots n_{8-9}$ are the indexes of refraction for the lens parts between the surfaces having the radii $r_1$ and $r_2$, $r_3$ and $r_4 \ldots r_8$ and $r_9$, and $\nu_{1-2}, \nu_{3-4} \ldots \nu_{8-9}$ are Abbe numbers for the glass of the lens parts between the surfaces having the radii $r_1$ and $r_2$, $r_3$ and $r_4 \ldots r_8$ and $r_9$.

References Cited by the Examiner

UNITED STATES PATENTS 2,165,341  7/1939  Capstaff _____ 88—1.5 X
3,052,169  9/1962  Papke _____ 95—42

FOREIGN PATENTS 1,112,538  11/1955  France.

NORTON ANSHER, *Primary Examiner.*

DELBERT B. LOWE, *Examiner.*